Figure 1:
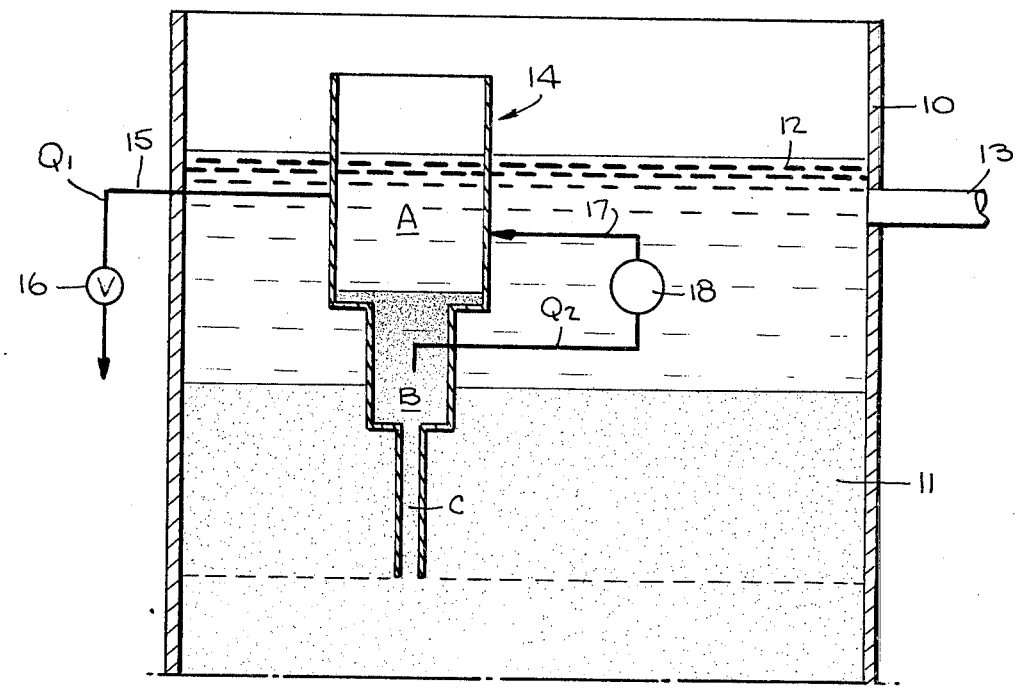

United States Patent [19]

Hickey et al.

[11] 4,250,033
[45] * Feb. 10, 1981

[54] EXCESS-GROWTH CONTROL SYSTEM FOR FLUIDIZED-BED REACTOR

[75] Inventors: Robert F. Hickey, Florence, Mass.; Roger W. Owens, Deer Park, N.Y.

[73] Assignee: Ecolotrol, Inc., Bethpage, N.Y.

[*] Notice: The portion of the term of this patent subsequent to Dec. 4, 1996, has been disclaimed.

[21] Appl. No.: 55,149

[22] Filed: Jul. 6, 1979

Related U.S. Application Data

[63] Continuation-in-part of Ser. No. 926,207, Jul. 19, 1978, Pat. No. 4,177,144.

[51] Int. Cl.³ .............................................. B01D 15/02
[52] U.S. Cl. .................................... 210/106; 210/113
[58] Field of Search ................. 210/3, 8, 80, 86, 91, 210/104, 106, 268, 263, 108, DIG. 22, 113; 55/77, 390

[56] References Cited

U.S. PATENT DOCUMENTS

| | | | |
|---|---|---|---|
| 3,846,289 | 5/1974 | Jeris et al. | 210/8 |
| 4,009,098 | 2/1977 | Jeris | 210/3 |
| 4,009,099 | 2/1977 | Jeris | 210/3 |
| 4,032,407 | 6/1977 | Scott et al. | 195/127 |
| 4,133,759 | 1/1979 | Ikeda et al. | 210/104 |
| 4,177,144 | 12/1979 | Hickey et al. | 210/263 X |

Primary Examiner—John Adee
Attorney, Agent, or Firm—Michael Ebert

[57] ABSTRACT

A control system to prevent the accumulation of excessive cellular material in a fluidized-bed reactor wherein a waste liquid to be processed is conducted upwardly at a velocity conducive to fluidization through a bed of particles which function as a carrier for the growth of the material. The system includes a separator column whose low end section extends toward the fluidized bed and whose high end section extends above a head of liquid effluent which lies on the bed, or is sealed and located below the surface of liquid effluent, the diameter of the high end section being greater than that of the low end section. In the course of reactor operation, the cellular material on the particles continues to grow, causing the bed to expand until its level reaches a point indicative of excessive growth. This point is sensed to activate an agitator arrangement which effects shearing of the excess cellular material from the particles to produce in the separator column a mixture of sheared material and partially stripped carrier particles. The separator column is provided with a draw-off port somewhat below the surface of the effluent head, the exit flow rate at the draw-off port being adjusted so that the resultant upward flow velocity in the separator column is lower than the settling velocity of the carrier particles in the mixture but higher than that of the sheared material. As a consequence, the sheared material is washed away through the draw-off port, whereas the partially stripped carrier particles fall back into the fluidized bed.

10 Claims, 3 Drawing Figures

U.S. Patent     Feb. 10, 1981     4,250,033

EXCESS-GROWTH CONTROL SYSTEM FOR FLUIDIZED-BED REACTOR

RELATED APPLICATION

This application is a continuation-in-part of our co-pending application Ser. No. 926,207, filed July 19, 1978, now U.S. Pat. No. 4,177,144 entitled "Excess-Growth Control System for Fluidized-bed Reactor."

BACKGROUND OF INVENTION

This invention relates generally to a fluidized-bed reactor in which waste water or other liquid to be processed is conducted upwardly through a bed of small carrier particles which in the course of operation are enlarged by the growth of cellular material thereon, and more particularly to a system having a broad operating range for controlling the accumulation of such material in a fluidized-bed reactor to prevent excessive growth thereof.

The invention will be described in connection with reactors for extracting nitrogen compounds such as nitrate or ammonia from waste water by means of a fluidized bed of solid particles serving as carriers for micro-organisms grown thereon. These reactors are preferably of the type disclosed in the Jeris et al. U.S. Pat. No. 3,846,289 and in the Jeris U.S. Pat. No. 4,009,099, whose entire disclosures are incorporated herein by reference.

It is to be understood, however, that a system in accordance with the invention is also applicable to other forms of fluidized, expanded or moving bed reactors in which the need exists to control the build-up of bacteria and other types of cellular material on the carrier particles to prevent excessive growth thereof. Thus the invention is useful in connection with the fluidized-bed reactors of the type disclosed in U.S. Pat. No. 4,032,407 and in the Jeris U.S. Pat. No. 4,009,098 and 4,009,105.

It is now recognized that the existence of nitrogen compounds in waste water represents a serious threat to ecological balances existing in nature. Accelerated eutrophication of lakes and streams is often caused by feeding conventionally-treated waste effluent into surface waters. While such treatment is designed to remove solids and oxygen-demanding organic material, they do not extract from these wastes the substantial quantities of ammonia and nitrate ions which are contained therein and which promote the production of algae.

Aside from being a major nutrient to algae growth, nitrogen in the form of ammonia is toxic to aquatic life and can react with a chlorine disinfectant to form chloramines which are carcinogenic. Hence there is a need for waste water treatment that effects almost complete denitrification; that is, the conversion of nitrate or nitrite compounds to non-polluting elemental nitrogen gas prior to the release of the wastes to surface waters.

The fluidized-bed reactors disclosed in the above-identified Jeris et al. and Jeris patents accomplish denitrification by a biological process in which bacteria act to reduce nitrite or nitrate constituents in the influent waste stream into harmless nitrogen gas. This process is carried out in a fluidized-bed reactor in which the waste water to be treated passes upwardly through a bed of small particles, such as activated carbon or sand, at a velocity sufficient to cause motion or fluidization of all of the medium which then functions as a carrier or support surface for the growth of bacteria.

The use of small sand or other particles provides a vast surface area on which the bacteria can flourish and grow, thereby making it possible to remove a considerable amount of contaminants from the waste water in a relatively small reactor volume. Fluidization of the medium augments the effective surface area, compared to that of packed beds, and it minimizes operational problems such as the clogging and head loss encountered in packed beds.

As waste water containing nitrogen in the form of ammonia or nitrate is passed through a fluidized bed, bacterial growth is accelerated and the size of the particles undergoes enlargement. If this growth is unchecked, the bed particles become enlarged to a degree resulting in agglomeration, thereby reducing the biological surface area per unit volume of the reactor and the efficiency of the reactor column. Moreover, as the particles swell, they are reduced in specific gravity and thereby acquire a tendency to float and to be carried away from the bed. Also, when the particles are excessively enlarged, they are prone to entrap or become attached to gas bubbles. This further reduces the specific gravity of the particles and the tendency of the particles to be carried away from the bed.

The primary concern of the present invention is with the removal of excess cellular material or bacterial growth on the particles of a fluidized-bed reactor in the course of operation, thereby obviating the tendency of the particles to be carried away in the process effluent. The term "excess cellular material" as used herein refers to the amount of material attached to the particulate carrier beyond that needed for the normal operating of the reactor. In a fluidized-bed reactor for denitrification, sufficient growth in the form of a thin layer of bacteria must be retained on the particles in order to maintain the efficiency of the process. Hence a system which so abrades or shears the particles as to remove all bacterial growth is destructive of the process.

Another concern of the invention is with the control of the thickness of the bio-mass layer on the carrier particles so that an optimum film thickness can be maintained in the biological reactor.

Various techniques have heretofore been proposed to prevent the accumulation of excess cellular material on the carrier particles in a fluidized-bed reactor. One such technique is disclosed in the Jeris U.S. Pat. No. 4,009,099 wherein the bacterial growth on the particles is monitored as a function of bed expansion. This is accomplished by an optical device or other form of solids sensor, such that when bed expansion reaches a given height to activate the sensor, the bed particles are regenerated by abrasion to remove excessive cellular material.

This is effected mechanically by a stirrer at the top of the column in the form of sharp rotating blades or other means. The partially stripped carrier particles acted upon by the stirrer settle back into the fluidized bed, whereas the sheared-off excess cellular material which has greater buoyancy than the carrier particles is carried away in the effluent process stream.

Since in this prior Jeris arrangement, the output of the reactor includes the excess cellular material, it is necessary to use a clarifier or other solids-separation means to remove the sheared solids from the process effluent.

Another approach heretofore taken to control the production of sludge is to permit the growth-covered particles to flow out with the process effluent into a settling tank which separates these particles from the process effluent. The excess growth is then mechanically sheared from the carrier particles, and the mixture of sheared sludge and particles is returned to the fluidized bed. In this technique, a clarifier or other solids separation unit must be used in conjunction with the settling tank to remove the sheared sludge from the process effluent. Alternatively, the sheared growth can be separated from the carrier particles in the return path between the settling tank and the fluidized bed, thereby eliminating the need for a clarifier in the output of the reactor, but requiring instead a separator unit in the return path.

Still another effective approach in current use for removing excess sludge is by means of a vibrating screen. In this technique, the growth-covered particles are pumped from the fluidized bed to the vibrating screen, the pumping action serving to agitate the particles and to shear excess growth therefrom and the vibrating screen functioning to separate the sheared growth from the carrier particles. These particles are then returned to the fluidized bed, whereas the sheared growth is wasted. Alternatively, shearing may be effected by means other than a pump.

The use of a vibrating screen in a growth control system has one important advantage, for it obviates the need for a clarifier in the output of the reactor. On the other hand, a vibrating screen is subject to plugging, and this dictates the use of a washing spray to keep the screen free. This is a serious drawback; for the spray dilutes the concentration of the waste sludge which must be further processed.

Moreover, during the operation of a vibrating screen, some sheared solids remain loosely attached to the carrier particles, and when the carrier particles are returned to the fluidized bed, these solids are brought along and escape into the process effluent, thereby degrading the quality of the effluent when the screen is operative. Furthermore, a vibrating screen, which is a fairly expensive and sophisticated unit, has inherent practical limitations with respect to the amount of liquid it can handle.

In calculating the overall cost of installing and operating an excess growth control system, one must not only take into account the amount of energy that is necessary to shear excess growth from the carrier particles but also the fact this shearing action directly affects the dewaterability of the resultant sludge. In order to dispose of this sludge, it must first be dewatered. If, for example, the abrading technique for shearing the growth tends to dissect the sludge into fine pieces which are then suspended in the water and are slow to settle, dewaterability becomes more difficult.

The nature of the pollutant being removed from the liquid and the type of fluidized-bed process employed for this purpose determines the type of biological organisms which predominate in the treatment system therefor. For a given system, there is an optimum amount of energy which must be imparted to the excess growth shearing means to attain the most dewaterable sludge.

Inasmuch as the handling and disposal of the sludge in a biological treatment facility can represent a substantial percentage of the overall cost of treatment, running as high as 40%, the dewaterability of the excess sludge production directly affects this cost and cannot, therefore, be disregarded; for the more easily dewaterable the sludge, the less expensive is the sludge-handling procedure.

Thus while various techniques and systems based thereon have heretofore been provided to control excess growth in a fluidized-bed reactor, all of these known techniques have entailed clarifiers and other expedients which add substantially to the cost of installing and operating the control systems in a manner yielding an effluent free of sheared material.

In our above-identified copending application, whose entire disclosure is incorporated herein by reference, there is disclosed a highly-efficient system for controlling the growth of cellular material on the carrier particles of a fluidized-bed reactor, the energy required to shear growth from the carrier particles being governed to produce a sludge having optimum dewaterability characteristics.

In a system of the type disclosed in my copending application for preventing the accumulation of excessive cellular material in a fluidized-bed reactor wherein waste water or other liquid to be processed is passed upwardly at a velocity conducive to fluidization through a bed of particles which function as a carrier for the growth of the material, a head of effluent is developed above the bed, the effluent being discharged from the reactor through a clear-effluent port.

Included in the system is an open-ended separator column whose low end extends toward the fluidized bed and whose high end extends above the effluent head or is sealed and located below the surface of the effluent head. In the course of reactor operation, the cellular material on the particles continues to build up, causing the bed to expand until its level reaches an alarm point indicative of excessive growth. This alarm point is sensed to activate an agitator arrangement which effects shearing of the excess growth from the carrier particles to generate in the separation column a mixture of sheared material and partially-stripped carrier particles.

The separator column is provided with a draw-off port somewhat below the surface of the effluent head. The exit flow rate of the draw-off port is adjusted so that the upward flow velocity in the separator column is lower than the settling velocity of the carrier particles in the mixture, but higher that that of the sheared material. As a consequence, the sheared material is washed away through the draw-off port, whereas the partially-stripped carrier particles fall back into the fluidized bed. This excess growth removal continues until the level of the bed falls to a predetermined safety point below the alarm point when the activity is discontinued to complete the cycle which is not repeated until the bed again expands to reach the alarm point.

Because the sheared growth is confined to the separator column, none of this material can enter the process effluent stream; hence there may be no need for a clarifier in the output line of the fluidized-bed reactor as in prior control systems to provide a clear effluent.

The practical difficulty experienced with a system of the type disclosed in our copending application is that the operating range of liquid velocity through the separator column is limited. If, therefore, in a given installation, the upward velocity is slightly higher than a predetermined acceptable level, the sand or carrier particles which have been partially sheared may be carried out with the sheared material and pass through the sludge discharge port instead of settling back into the bed.

On the other hand, if the liquid velocity is slightly lower than the predetermined acceptable level, the sludge may back up into the fluidized bed reactor. Since the optimum velocity may vary from plant to plant, this factor creates difficulties in designing the unit for different bacterial processes.

SUMMARY OF INVENTION

In view of the foregoing, the main object of this invention is to provide a system having a broad operating range for controlling the growth of cellular material in a fluidized-bed reactor wherein waste water or other liquid to be processed is conducted upwardly through a bed of sand or similar carrier particles which, in the course of operation, are enlarged by the growth of cellular-material thereon.

More particularly, it is an object of this invention to provide in a system of the above type, an open-ended separator column whose low end section extends toward the fluidized bed and whose high end section extends above the effluent head or is sealed and located below the surface of the effluent head, the configuration of the column being such as to prevent carrier particles from being washed out of the column via the sludge draw-off port and to prevent sheared (biomass) from backing up into the fluidized bed reactor during the separation process.

Briefly stated, these objects are attained in a control system for preventing the accumulation of excessive cellular material in a fluidized-bed reactor wherein waste water or other liquid to be processed is conducted upwardly therein at a velocity conducive to fluidization through a bed of particles which function as a carrier for biological growth, a head of effluent being developed above the bed from which the effluent is discharged from the reactor.

The system comprises a separator column disposed in the reactor, the column having a low end section extending toward the fluidized bed and a high end section extending above the surface of the effluent head or sealed and located below the surface of the effluent head, said column being provided with a draw-off port somewhat below the surface of the effluent head.

An agitator arrangement associated with the column, when activated, effects shearing of the excess cellular material from the particles to produce in the column a mixture of sheared material and partially-stripped carrier particles. This arrangement is activated only when the expansion of the fluidized bed reaches a limit indicative of excessive growth to provide an exit flow rate at the draw-off port which results in an upward flow velocity in the separator column that is lower than the settling velocity of the partially-stripped carrier particles but higher than the settling velocity of the sheared material which is washed away through the draw-off port. The low end section of the column has a diameter that is smaller than the high end section thereof, whereby if the upward velocity in the high end section is at a value causing some sheared material as well as carrier particles to settle therein, the velocity in the low end section is at a higher value to prevent back-up of said sheared material into the reactor.

OUTLINE OF DRAWINGS

Figure 2:
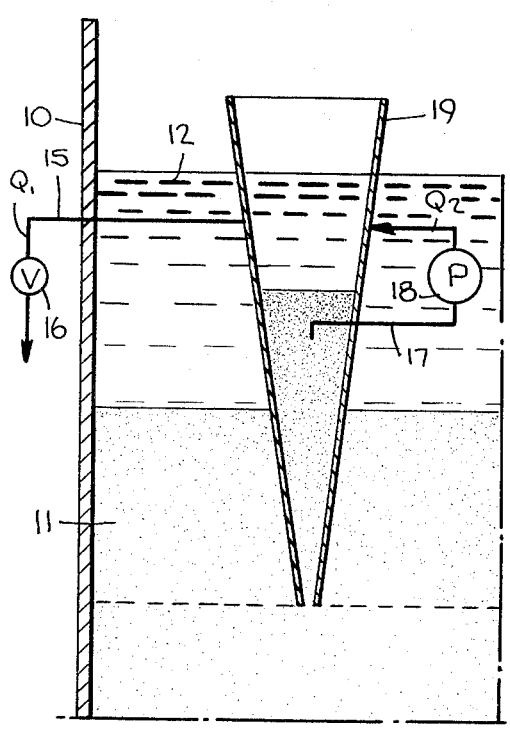
Figure 3:
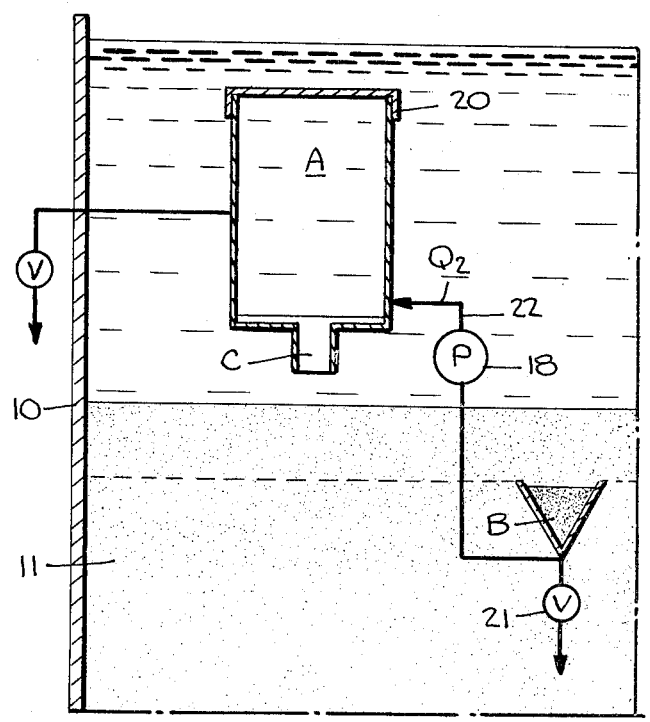

For a better understanding of the invention as well as other objects and further features thereof, reference is made to the following detailed description to be read in conjunction with the accompanying drawings, wherein:

FIG. 1 schematically illustrates a known form of fluidized bed reactor operating in conjunction with an excess-growth control system having a separator column in accordance with one preferred embodiment of the invention;

FIG. 2 schematically illustrates a second embodiment of the separator column; and FIG. 3 illustrates a third embodiment of the separator column.

DESCRIPTION OF INVENTION

First Embodiment:

Since an excess-growth control system in accordance with the invention is usable with any known form of fluidized bed reactor such as the reactor disclosed in the Jeris U.S. Pat. No. 4,009,099, the reactor structure and its operation will only be briefly outlined.

As shown in FIG. 1, waste water or other liquid to be process is introduced into the reactor 10 through a valve and inlet pipe feeding the liquid into the lower portion of the reactor through a manifold in the manner disclosed in the above-identified copending application. Micro-organisms or biota-seeded bed particles of sand or other particular material are fluidized by the passage of the waste water at an appropriate velocity through the reactor column to create a fluidized bed 11.

Developed above the fluidized bed 11 is an effluent head 12 whose level is fixed by a clear-effluent discharge port 13 adjacent the upper end of the reactor. In the course of reactor operation, the cellular material on the particles continues to grow, causing fluidized bed 11 to expand upwardly, this expansion being accompanied by the concurrent contraction of the effluent head 12.

Associated with the fluidized bed reactor is a control system to prevent the accumulation of excessive cellular material. The control system includes a relatively small, open-ended separator column 14 immersed in effluent head 12, the low end section of the separator column extending into the fluidized bed and the high end section thereof extending above the effluent head.

At a point somewhat below the surface of effluent head 12, separator column 14 is provided with a draw-off port 15 which feeds sheared material washed out of the column into a dewatering unit through a valve 16 at a flow $Q_1$. This valve is closed when the control system is inactive. Shearing of the cellular growth is carried out by means of a loop 17 which includes a pump 18 that acts to draw the coated particles at a liquid flow $Q_2$ from the column at an intermediate point therein and to return the particles to the column at a higher point, the pump action providing the necessary agitation or stirring of the particles to effect shearing thereof.

As the fluidized bed expands upwardly, its level reaches an alarm point indicative of excess cellular material, which condition is detected by a level or solids sensor. This sensor may be an electro-optical or any other suitable form adapted to produce a signal when the alarm point is reached. The signal from the sensor serves to simultaneously activate pump 18 and to open valve 16 by means of an electronic control unit responsive thereto.

The upward flow velocity through separator 14 is determined by the exit flow rate $Q_1$ from the draw-off port 15 as set by adjustment of valve 16. In practice, valve 16 may take the form of a controllable pump to adjust this rate to an optimum value. This exit flow rate is set so that the upward flow velocity in the separator column is higher than the downward settling velocity of the sheared growth, but lower than the downward settling velocity of the partially stripped carrier particles. As a consequence, the sheared cellular material is forced upwardly in the separator column and washed away through draw-off port 15 into a dewatering unit, whereas the carrier particles in the mixture fall back into the fluidized bed. In this action, the specific gravity of the coated particles is increased when most of the relatively-light cellular growth attached thereto is sheared off. In addition, by adjusting valve 16 the concentration of the waste sludge can be controlled.

As this activity continues, the size of the particles in the fluidized bed is diminished and the level of the bed gradually drops until a safety point is reached, this condition being sensed by a suitable level sensor which generates a signal indicative of this condition, this signal being applied to the electronic control unit to deactivate shearing pump 18 and to turn off valve 16, thereby completing the excess—growth removal cycle. This cycle is not repeated until the level of the fluidized bed again rises as a result of cellular growth, to reach the predetermined alarm point.

As pointed out previously, the problem with separator columns of the types disclosed in the copending application in which the columns are of uniform diameter throughout its length except in some instances at the inlet section, is that the control systems are not capable of operating throughout a broad range of liquid velocities. Hence if the liquid velocity is slightly higher in the column than the desired value, bed particles or sand may be carried out in the sludge discharge, whereas if the velocity is slightly below the desired value, sludge may back up into the reactor.

To overcome this drawback, separator column 14 shown in FIG. 1 has three distinct sections A, B and C, the high end section A having a relatively large diameter; the intermediate section having a smaller diameter, and the low end section which extends into the fluidized bed having the smallest diameter. It will be noted that the loop 17, which includes shearing pump 18, has its inlet going in intermediate section B and its outlet feeding upper end section A.

We shall assume that the intermediate section B is dimensioned for optimum liquid velocity so that the diameter of this section would be the same as a separator column of uniform diameter of the types disclosed in the copending case. If now a condition arises where the liquid velocity becomes slightly higher than the desired value in section B, sand still could not escape from the separator column because the liquid velocity is immediately reduced in the section A thereabove. Conversely, if the liquid velocity is slightly lower than the desired level in section B, it will be higher in lower section C, and this will prevent sludge from flowing back into the reactor.

Thus intermediate section B functions as a sludge concentration section, section A thereabove as the sand safety section, and section C therebelow as the sludge back-up safety section. In this way, the effective operating range is extended and one is able to design the unit for various bacterial processes without danger that in different installations, there will be either sand withdrawal that would deprive the fluidized bed of material or sludge back-up that would contaminate the effluent of the system.

SECOND EMBODIMENT

In the arrangement shown in FIG. 2, the separator column 19, instead of being in a stepped formation, as in the case of FIG. 1 with distinct sections, has a conical formation; hence its diameter progressively increases from the lower end to the upper end thereof. Concentration of sludge takes place in the midportion of the cone.

With this conical formation, the level at which the material is abraded to separate the excess growth from the fluidized bed particles can be set for optimal conditions, thereby affording maximum waste sludge concentration.

THIRD EMBODIMENT

In terms of producing the maximum sludge concentration, the unit shown in FIG. 3 is the most preferred embodiment. In this unit, the separator tube 20 has an upper end section A of large diameter and a lower end section C of relatively small diameter, there being no intermediate section as in FIG. 1.

Instead of an intermediate section, the unit is provided with a concentrator section B in a funnel formation which is immersed in the fluidized bed. In practice, the concentrator section may be attached to the interior wall of reactor 10 and resembles a weir or trough. When the growth control system is not activated, solenoid valve 21 remains open allowing the fluidized bed particles to circulate freely through the funnel. When valve 21 is closed, the contents of the funnel are pumped through line 22 by shearing pump 18 into section A of the separator column 20. It should be noted that the funnel could be located in the effluent head and lowered into the bed when needed rather than using a fixed funnel with the solenoid valve.

The function of concentrator section B is to allow the fluidized bed particles which rise above its mouth to settle into it. When the control system is activated, the material settled in concentrator section B is then pumped into the separator column. This results in a significantly higher sludge concentration that is achievable by abrading the material in the fluidized state.

Valve 21 in the output end of concentrator section B remains open when the growth control system is not in operation. This permits fluidized bed particles to travel freely through the concentrator section until the growth control system is activated. When, however, the system is activated, solenoid valve 21 is caused to close, thereby permitting fluidized bed particles to settle in the concentrator section B, from which point they are pumped by shearing pump 18 into the upper section A of separator column 20. Thus solenoid valve 21 acts to prevent the media in the reactor from packing in the concentrator section when the separator column is not in operation.

The flow rate $Q_1$ must always be maintained slightly higher than or equal to flow rate $Q_2$, determined by pump 18 at which the sand to be sheared is pumped into section A, or else sludge will back up into the unit. Hence this arrangement is somewhat more difficult to control than the embodiments in FIGS. 1 and 2.

In the embodiments shown in FIGS. 1, 2 and 3, the open upper end of the separator column is above the surface of the effluent head 12. In practice, however, the upper end of the columns may be sealed by caps and submerged below the surface, this making possible a more compact separator and one which is easier to support. Also, while the system has been described in conjunction with a fluidized bed reactor, it is usable also with an expanded bed and/or moving bed systems.

In the embodiment in FIG. 3, the concentrator section B may be provided with a density sensor (not shown) to ensure a thick sludge, the sensor acting to activate pump 18 in the agitator arrangement only when the sludge attains a predetermined thickness.

In the embodiments of FIGS. 1 and 3, the separator columns have a stepped formation. In practice, it may be desirable to provide a taper rather than an abrupt transition between sections of the column so that growth will not then tend to build up on the step ledges and become anaerobic. A taper angle of 30° is sufficient to eliminate solids deposition.

While there have been shown and described preferred embodiments of an Improved Excess-Growth Control System for Fluidized-Bed Reactor in accordance with the invention, it will be appreciated that many changes and modifications may be made therein without, however, departing from the essential spirit thereof.

We claim:

1. A control system for preventing accumulation of excessive cellular material in a fluidized-bed reactor wherein waste water or other liquid to be processed is conducted upwardly therein at a velocity conducive to fluidization through a bed of particles which function as a carrier for the growth of the material, a head of effluent being developed above the bed from which the effluent is discharged from the reactor; the system comprising:

A. a separator column disposed in the reactor, said column having a low end section extending toward the fluidized bed and a high end section at least a portion of which lies within the effluent head, said column being provided with a drawoff port somewhat below the surface of the effluent head;

B. an agitator arrangement associated with the column to effect, when activated, shearing of the excess cellular material from the particles to produce in the column a mixture of sheared material and partially-stripped carrier particles; and C. means to activate said arrangement when the expansion of the fluidized bed, as a result of said growth, reaches a limit indicative of excessive growth to provide an exit flow rate at the draw-off port which results in an upward flow velocity in the separator column that is lower than the settling velocity of the partially-stripped carrier particles but higher than the settling velocity of the sheared material whereby the sheared material is washed away through the drawoff port, said low end section having a diameter that is smaller than the high end section whereby if the upward velocity in the high end section is at a value causing some sheared material as well as carrier particles to settle therein, the velocity in the low end section is at a higher value to prevent back-up of said sheared material into the reactor.

2. A system as set forth in claim 1, wherein said high end section extends above the surface of the effluent head.

3. A system as set forth in claim 1, wherein said high end section is capped and lies below the surface of said head.

4. A control system as set forth in claim 1, wherein said separator column further includes a section intermediate said low end section and said high end section and having a diameter of intermediate value whereby if the upward velocity in the intermediate section is at a value causing carrier particles as well as sheared material to be washed away, the velocity in the high end section is then at a lower value to prevent carrier particles from being washed away.

5. A control system as set forth in claim 4, wherein said agitator arrangement is constituted by a loop having a pump therein extending between the intermediate section and the high end section to draw carrier particles having excess cellular material from the intermediate section to shear said particles and to feed the mixture of sheared material and partially-stripped carrier particles into the high end section.

6. A control system as set forth in claim 5, wherein said separator column has a stepped formation to define distinct low end, intermediate and high end sections.

7. A control system as set forth in claim 6, wherein said separator column has a conical formation of progressively increasing diameter, the lower portion of which acts as the low end section, the intermediate portion of which as the intermediate section, and the upper portion as the high end section.

8. A control system as set forth in claim 1, further including a concentrator section in a funnel formation immersed in the fluidized bed, said agitator arrangement being constituted by a line including a pump to draw carrier particles having excess growth therein which have settled in the concentrator section from the outlet thereof into the high end section of the separator column.

9. A control system as set forth in claim 8, further including a valve in the outlet area of the concentrator section, which valve is closed when the agitator arrangement is operative and is open when it is not in operation to permit free flow through the concentrator section.

10. A control system as set forth in claim 9, further including a density sensor disposed in said concentrator section to render said agitator arrangement operative when the sensed density of particles settled in said concentrator section attains a predetermined value.

* * * * *